3,247,228
**REGENERATION OF DEGRADED ANTHRAQUI-
NONE WORKING SOLUTION BY TREATMENT
WITH AN ION EXCHANGE RESIN**
Hans Kunowski, Bad Honningen, Germany, assignor to
Kali-Chemie Aktiengesellschaft, Hannover, Germany,
a corporation of Germany
No Drawing. Filed Feb. 21, 1962, Ser. No. 175,388
Claims priority, application Germany, Feb. 27, 1961,
K 43,024
6 Claims. (Cl. 260—369)

The present invention relates to an improvement in the process of producing hydrogen peroxide by the anthraquinone method and more particularly to an improved process of regenerating the degraded anthraquinone working solutions used in the cyclic reduction and oxidation operations to produce hydrogen peroxide.

It is known to produce hydrogen peroxide in a cyclic process by alternately hydrogenating alkyl anthraquinones and oxidizing the resulting alkyl anthrahydroquinone by oxidation, for instance, by means of air whereby hydrogen peroxide is set free. Reduction and oxidation are carried out in an organic solvent or a mixture of solvents wherein the alkyl anthraquinone as well as the alkyl anthrahydroquinone are soluble. The hydrogen peroxide formed on oxidation is extracted from its organic solution by means of water. On hydrogenating the anthraquinone compound by means of Raney nickel or palladium catalysts, tetrahydroanthraquinone is formed as a by-product by the addition of hydrogen to the aromatic ring. Said tetrahydroanthrahydroquinone is not detrimental to the formation of hydrogen peroxide but is as useful as anthrahydroquinone itself.

It is also known that not only the above mentioned hydrogenation to tetrahydroanthrahydroquinone takes place in such a cyclic process but also other undesired side-reactions whereby compounds are formed which do not participate, like the active anthraquinone and also the active tetrahydroanthraquinone, in the formation of hydrogen peroxide. The amounts of these by-products which are useless as oxygen transfer agents, increase more and more in the recycling working solution. At the same time, the content of active anthraquinone, also comprising the tetrahydroanthraquinone, decreases. As a result thereof considerable difficulties are encountered in such a cyclic process of producing hydrogen peroxide.

It has been suggested to regenerate the working solution by separating the undesired by-products. Attempts have also been made to convert the inactive compounds into anthraquinone compounds which are effective in the formation of hydrogen peroxide. For this purpose the spent working solution was treated with various reactants usually at elevated temperature whereby alcohol was preferably added as dissolving aid.

However, the known regeneration processes have a number of disadvantages. Especially disturbing is the fact that degradation products are formed on heat treatment of the spent working solution. Such degradation products can be removed only with difficulty from the regenerated working solution. Furthermore, such regeneration usually does not permit continuous operation because the various liquid phases obtained on removing, by washing, the regenerating agent can often be separated from each other only with great difficulty.

It is one object of the present invention to provide a simple and effective process of regenerating the degraded anthraquinone working solution used in the cyclic process of producing hydrogen peroxide which regenerating process is free of the disadvantages of the known regenerating processes.

Other objects of the present invention and advantageous features thereof will become apparent as the description proceeds.

In principle the process of regenerating such degraded anthraquinone working solutions according to the present invention consists in treating the working solution, with an ion exchange agent at a temperature between 30° C. and the boiling point of the solution. Such treatment is preferably effected in the presence of an oxidizing agent.

Suitable ion exchange agents are cationic as well as anionic exchangers and especially cationic and anionic exchange resins. Useful cationic exchange resins are the known, commercially available polystyrene, phenol, or polyacrylic acid resins while polystyrene or polyamine resins are useful anionic exchange resins. Especially effective is the OH$^-$ form of an anionic exchange resin while the Cl$^-$ form is much less effective. The speed of reaction of the H$^+$ form of a cationic exchange resin has also proved to be slower than that of the OH$^-$ form of an anionic exchange resin.

According to a preferred embodiment of the present invention reaction on the ion exchange agent is effected in the presence of alcohols, preferably lower alkanols such as methanol, ethanol, and the like.

The highest reaction temperature to be employed in this process is dependent on the boiling point of the alkanol used when operating under atmospheric pressure. In general, temperatures between about 50° C. and about 80° C. have proved to yield satisfactory results although operation at a temperature below 50° C. is possible whereby, of course, the speed of reaction is accordingly lower.

As stated above, reaction on the ion exchange agent may also be effected in the presence of oxidizing agents such as air or hydrogen peroxide. Thereby, not only the inactive anthraquinone is converted into active anthraquinone but also the ring-hydrogenated anthraquinone is oxidized and dehydrogenated to the active non-ring-hydrogenated anthraquinone. As a result thereof the contents of ring-hydrogenated anthraquinone can be kept rather low in the recycled working solution.

An essential advantage of the process according to the present invention is to be seen in the fact that the regeneration step can directly be included into the cycle of hydrogenating and oxidizing the anthraquinone because no tedious and protracted washing and neutralizing of the regenerated working solution is required. In general, it is sufficient if only part of the working solution is subjected to the treatment with the ion exchange agent. For this purpose the ion exchange agent is preferably arranged in solid bed form. The proportion of working solution passed through the ion exchange agent per hour to the volume of ion exchange agent controls the time of contact of the working solution to be regenerated in the zone of reaction with the ion exchange agent. Air or other oxidizing agents may be introduced, preferably countercurrently, into the vessel containing the ion exchange agent. This vessel must, of course, be of suitable dimensions. The resulting regenerated working solution leaving the bed of ion exchange agent need only be freed of the lower alkanol which has been added to accelerate the reaction with said agent. Removal of the alkanol is effected by distillation or extraction with water.

If treating the working solution with ion exchange agents in absence of an oxidizing agent the activation proceeds only to the alkyltetrahydroanthraquinone, which disturbs the process because of a lowgrade solubility.

*Example 1*

A working solution initially composed of 120 g. of 2-tertiary butyl anthraquinone, 380 g. of octanol, and 500 g. of xylene contained only 50% of active quinone after operation for 10 months. 400 cc. of methanol were added to 1,600 cc. of said solution. The mixture was stirred with 700 cc. of the cation exchange agent sold under the trademark "Lewatit S–100" by Farbenfabriken Bayer, i.e. a phenolic resin containing sulfonic acid groups, at 60° C. for 6 hours while passing air therethrough. Thereafter, the ion exchange agent was separated from the solution which was washed with deionized water to remove the methanol. The content of active quinone of the resulting methanol-free solution was increased to 60% of its initial content.

*Example 2*

400 cc. of methanol and 750 cc. of the strongly basic anionic exchange resin sold under the trademark "Permutit ESB" by Permutit A.G., Berlin, i.e. a polystyrene resin containing quaternary ammonium groups were added to 1,600 cc. of the spent working solution of Example 1. The mixture was stirred at 60° C. for 9 hours, while passing air therethrough. Samples were taken after 2 hours, 5 hours, 7 hours, and 9 hours. Said samples were washed with deionized water and the contents of quinone and ring-hydrogenated quinone were determined in the washed samples. The results were as follows:

G./kg. of solution
(a) Before the treatment:
  Quinone _____ 42.75
  Ring-hydrogenated quinone _____ 19.20
(b) After 2 hours:
  Quinone _____ 74.0
  Ring-hydrogenated quinone _____ 45.4
(c) After 5 hours:
  Quinone _____ 87.5
  Ring-hydrogenated quinone _____ 31.6
(d) After 7 hours:
  Quinone _____ 95.1
  Ring-hydrogenated quinone _____ 23.8
(e) After 9 hours:
  Quinone _____ 96.0
  Ring-hydrogenated quinone _____ 19.8

Thus the contents of active quinone, i.e. of non-hydrogenated quinone and of ring-hydrogenated quinone amounted to 97% of the initial contents of active quinone after regeneration according to the present invention.

*Example 3*

200 cc. of methanol were added to 1,000 cc. of the working solution of Example 1. The mixture was passed at a temperature of 40–50° C. through a column of the anionic exchange resin of medium basicity sold under the trademark "Amberlite IRA–400" by Rohm & Haas, i.e. a phenolic resin containing amino and imino groups. The working solution was in contact with the exchange resin for about one hour. At the same time air was passed countercurrently through said column. After such a treatment the regenerated working solution was extracted with deionized water and contained about 60% of the initially present active quinone.

*Example 4*

A working solution composed of 120 g. of 2-ethyl anthraquinone, 380 g. of octanol, and 500 g. of xylene was used in the cyclic process of producing hydrogen peroxide. After 10 months of operation said solution contained only 50% of the initially present active quinone. 300 cc. of methanol and 100 cc. of a 15% aqueous hydrogen peroxide solution were added to 600 cc. of said spent working solution. The mixture was passed at a temperature of 70–75° C. through a column of the strongly basic anionic exchange resin sold under the trademark "Dowex 1" by Dow Chemical Co., i.e. a polystyrene resin containing amino groups. The thus treated working solution was extracted with deionized water and contained about 95% of the initially present active quinone.

*Example 5*

A working solution composed of 120 g. of tertiary butyl anthraquinone, 380 g. of octanol, and 500 cc. of xylene was used in the cyclic process of producing hydrogen peroxide. After operation for 18 months, said solution contained 50 g. of tertiary butyl anthroquinone, 10 g. of tertiary butyl tetrahydroanthraquinone, and 60 g. of inactive quinone. 400 cc. of methanol were added to 1,600 cc. of said degraded working solution which was then passed at 50–55° C. through a column of the strongly basic anionic exchange resin sold under the trademark "Lewatit MP–500" of Farbenfabriken Bayer, i.e. an amine polycondensation product. At the same time air was passed countercurrently through the column. The working solution remained in the reaction zone for about 3 hours. Thereafter, it was washed with deionized water. The resulting regenerated working solution contained 95 g. of tertiary butyl anthroquinone and 20 g. of tertiary butyl tetrahydroanthraquinone corresponding to about 95.8% of the initially present active quinone.

It is, of course, understood that the working solution may have another composition as given in the examples. Other alkyl anthraquinones and other solvents than those given may be used in accordance with the prior art.

Of course, many changes and variations in the composition of the starting anthraquinone solution, in the solvents employed as dissolving aids, in the ion exchange agents used, in the reaction conditions, temperature, and contact time, in the oxidizing agents used, in the methods of removing the dissolving aid from the regenerated anthraquinone solution, and the like may be made by those skilled in the art in accordance with the principles set forth herein and in the claims annexed hereto.

I claim:

1. In a process of regenerating the degraded working solution used in the cyclic process of producing hydrogen peroxide according to the anthraquinone method, the step which comprises contacting the oxidized working solution containing inactive degradation products of the alkyl anthraquinone employed as oxygen transfer agent, with a synthetic ion exchange resin at a temperature between about 30° C. and about 80° C. to convert such degradation products into active alkyl anthraquinone compounds.

2. In a process of regenerating the degraded working solution used in the cyclic process of producing hydrogen peroxide according to the anthroquinone method, the steps which comprise admixing a lower alkanol to the oxidized working solution containing inactive degradation products of the alkyl anthraquinone employed as oxygen transfer agent, and containing said mixture with a synthetic ion exchange resin at a temperature between about 30° C. and about 80° C. to convert inactive degradation products of the alkyl anthraquinone employed into active alkyl anthraquinone compounds.

3. In a process of regenerating the degraded working solution used in the cyclic process of producing hydrogen peroxide according to the anthraquinone method, the steps which comprise admixing a lower alkanol to the oxidized working solution containing inactive degradation products of the alkyl anthraquinone employed as oxygen transfer agent, contacting said mixture with a synthetic ion exchange resin at a temperature between about 30° C. and about 80° C. to convert inactive degradation products of the alkyl anthraquinone employed into active alkyl anthraquinone compounds, and simultaneously reacting said solution with an oxidizing agent to convert ring-hydrogenated alkyl anthraquinone into nonhydrogenated alkyl anthraquinone.

4. In a process of regenerating the degraded working solution used in the cyclic process of producing hydrogen peroxide according to the anthraquinone method, the steps which comprise contacting the oxidized working solution containing inactive degradation products of the alkyl anthraquinone employed as oxygen transfer agent, with a synthetic ion exchange resin at a temperature between about 30° C. and about 80° C. to convert inactive degradation products of the alkyl anthraquinone employed into active alkyl anthraquinone compounds, and simultaneously reacting said solution with an oxidizing agent to convert ring-hydrogenated alkyl anthraquinone into non-hydrogenated alkyl anthraquinone.

5. The process according to claim 4, wherein the oxidizing agent is air.

6. The process according to claim 4, wherein the oxidizing agent is hydrogen peroxide.

References Cited by the Examiner
UNITED STATES PATENTS

| | | | |
|---|---|---|---|
| 2,842,563 | 7/1958 | Hinegardner et al. | 260—369 |
| 2,940,987 | 6/1960 | Eller et al. | 260—369 |

FOREIGN PATENTS

| | | |
|---|---|---|
| 798,237 | 7/1958 | Great Britain. |

OTHER REFERENCES

Kunin, R.: Ion Exchange Resins, 2nd edition (1958), John Wiley & Sons, Inc., New York, pp. 5, 11 and 55.

Nachod, F. C., et al.: Ion Exchange Technology (1956), Academic Press Inc., New York, p. 5.

Kunowski, German application 1,132,548, Kl. 12i–16 July 5, 1962.

LORRAINE A. WEINBERGER, *Primary Examiner.*

CHARLES B. PARKER, LEON ZITVER, *Examiners.*